United States Patent
Mack et al.

(10) Patent No.: US 6,896,313 B2
(45) Date of Patent: May 24, 2005

(54) CONVERTIBLE COVER ARRANGEMENT FOR VEHICLE CARGO AREA

(75) Inventors: Kenneth S Mack, Metamora Township, MI (US); Thomas S Moore, Oxford, MI (US); Russell C Fielding, Clarkston, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 10/942,261

(22) Filed: Sep. 16, 2004

(65) Prior Publication Data

US 2005/0029829 A1 Feb. 10, 2005

Related U.S. Application Data (62) Division of application No. 10/626,102, filed on Jul. 24, 2003, now Pat. No. 6,820,915.
(60) Provisional application No. 60/398,221, filed on Jul. 24, 2002.

(51) Int. Cl.[7] .................................................. B60P 7/02
(52) U.S. Cl. .............................. 296/100.08; 296/26.05; 296/100.06
(58) Field of Search ..................... 296/100.08, 100.06, 296/100.07, 37.6, 100.17, 100.1, 100.02, 100.01, 156, 26.04, 164, 26.07, 146.16, 26.05

(56) References Cited

U.S. PATENT DOCUMENTS

| | | | | | |
|---|---|---|---|---|---|
| 1,481,543 | A | * | 1/1924 | Eke | 296/100.08 |
| 2,168,069 | A | * | 8/1939 | Miller | 296/26.05 |
| 2,531,140 | A | * | 11/1950 | Linde | 296/100.08 |
| 3,155,423 | A | * | 11/1964 | Cripe | 296/100.08 |
| 3,202,455 | A | * | 8/1965 | Grotz | 296/100.08 |
| 3,649,073 | A | * | 3/1972 | Whittemore | 296/100.08 |
| 3,675,885 | A | * | 7/1972 | Shute | 296/100.08 |
| 4,328,989 | A | * | 5/1982 | Childers | 296/26.05 |
| 4,603,901 | A | * | 8/1986 | McIntosh et al. | 296/26.05 |
| 4,815,786 | A | * | 3/1989 | McRay | 296/100.06 |
| 4,858,841 | A | * | 8/1989 | Woodley et al. | 242/532.1 |
| 5,002,329 | A | * | 3/1991 | Rafi-Zadeh | 296/100.08 |
| 5,086,134 | A | * | 2/1992 | Antberg et al. | 526/126 |
| 5,364,154 | A | * | 11/1994 | Kaiser | 296/100.08 |
| 6,217,102 | B1 | * | 4/2001 | Lathers | 296/100.07 |
| 6,572,168 | B1 | * | 6/2003 | Radstake | 296/37.6 |
| 6,712,418 | B1 | * | 3/2004 | Lathers | 296/100.06 |
| 2003/0090116 | A1 | * | 5/2003 | Radstake | 296/24.1 |

* cited by examiner

*Primary Examiner*—Kiran B. Patel
(74) *Attorney, Agent, or Firm*—Thomas A. Jurecko (57) ABSTRACT

A convertible cargo bed cover can function as both a tonneau cover and a cargo bed cap. The cover is raised by motorized elements to be substantially aligned with a roof of a passenger cabin of the vehicle. Side and rear window panels stored inside the cover can be installed to transform the cover to a cap to enlarge available enclosed cargo space. Rear pillars are installed at the rear corners of the tonneau cover in its raised position to complete the installation.

6 Claims, 10 Drawing Sheets

CONVERTIBLE COVER ARRANGEMENT FOR VEHICLE CARGO AREA

CROSS-REFERENCE TO RELATED APPLICATIONS

This application is a divisional application of U.S. Ser. No. 10/626/102, filed Jul. 24, 2003 U.S. Pat. No. 6,820,915, which claims the benefit of provisional application No. 60/398,221 filed Jul. 24, 2002.

BACKGROUND OF THE INVENTION

The invention generally relates to covers for vehicular cargo beds, such as pick-up truck boxes. More specifically, the invention pertains to a movable cover which may function as a tonneau cover and can be converted to a cargo bed cap cover.

Various types of covers for open cargo beds, such as found in pick-up trucks have become common place. A first conventional cover, styled a tonneau cover, traditionally rests on side panels of the cargo bed and covers any contents either partially or fully.

A second type of cover called a cap has become well known for use with cargo beds of vehicles such as pick-up trucks. The cap cover conventionally also rests upon the side panels of the cargo bed but extends upwardly to substantially align itself with a width of the passenger cabin to form an enlarged closed cargo space either for larger items or for converting the vehicle to a camper.

These individual styles of covers have traditionally been independent of each other and if one switches between cover types, the unused cover must be stored separately from the vehicle.

There is a need for a cover arrangement which may be convertible between a tonneau cover and a cap cover.

SUMMARY OF THE INVENTION

A deployable cover for a cargo bed of a vehicle includes a movable tonneau cover having a closed position adapted to close off the cargo bed. A plurality of linearly extendable supports positioned with respect to the tonneau cover such that they may extend to move the tonneau cover from its closed position to an upwardly extended deployed position is also provided wherein the tonneau cover is substantially parallel to a bottom surface of the cargo bed and raised above the side panels of the vehicle.

In a further aspect of the invention, the tonneau cover contains a storage space for side and rear window panels which slide into place between the raised tonneau cover and the side panels of the vehicle to form cap-like cover therefor.

BRIEF DESCRIPTION OF THE DRAWING

The objects and features of the invention will become apparent from a reading of a detailed description, taken in conjunction with the drawing, in which.

DETAILED DESCRIPTION

Figure 1:
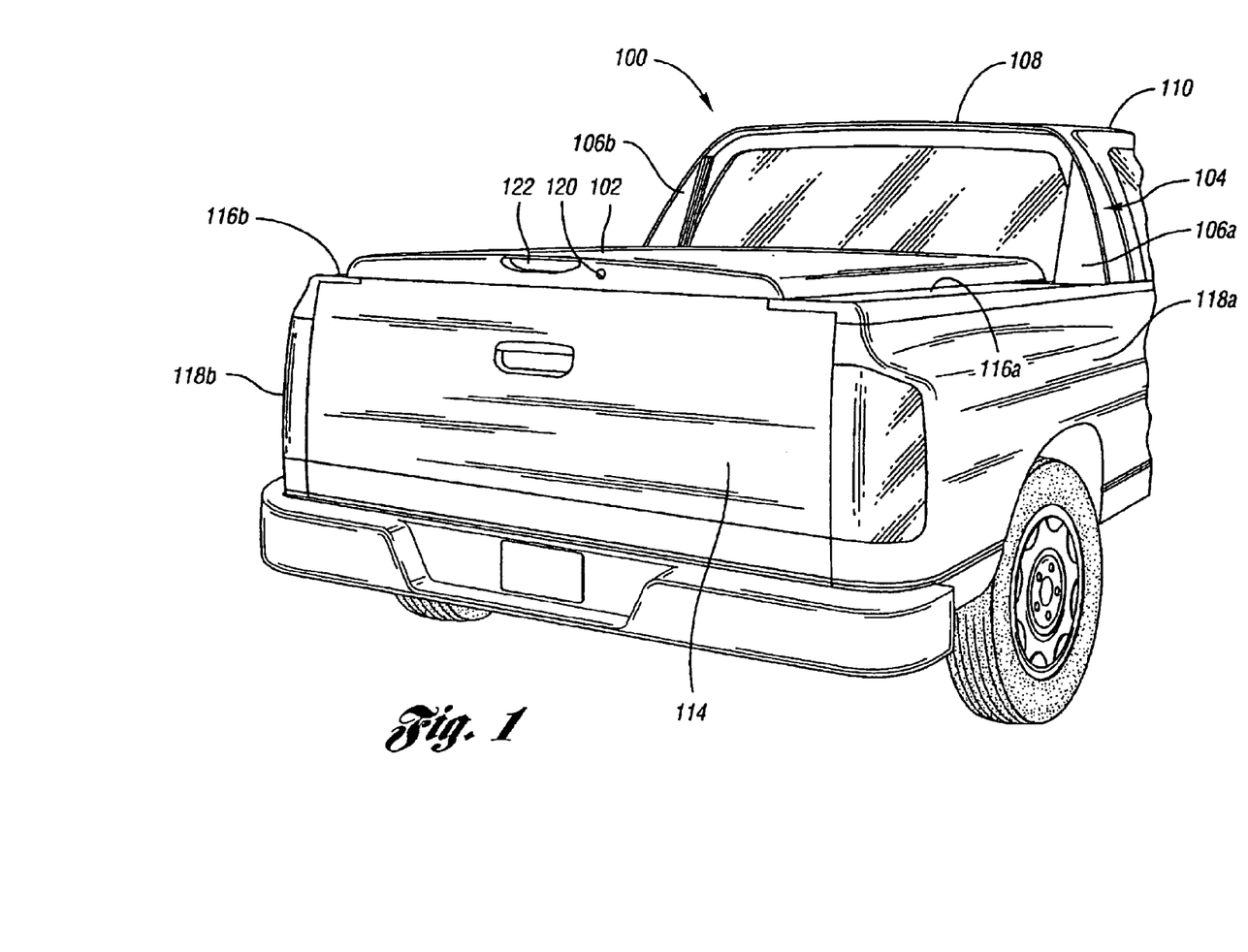
FIG. 1 is a rear view of a pick-up truck with a tonneau cover of the invention in a down and closed position.

With reference to FIG. 1, pick-up truck 100 includes a passenger cabin 110 and a cargo bed defined by vehicle side panels 118a and 118b, a tailgate 114 and a front faring 104. A tonneau cover 102 is fashioned from a substantially rigid rather than fabric material of most conventional tonneau covers for purposes to become apparent as the description continues.

The front faring 104 is a cross-car structure located at the front corners of the pick-up box or cargo bed and is an integral part of top plates 116a and 116b respectively associated with side panels 118a and 118b of the vehicle. The rearview shape of front faring 104 is identical to that of the upper half of the passenger cabin 110. In a side view, the faring's front surface also resembles the passenger cabin's shape, but the width of the faring is narrower at the top than it is at its base, thus providing opposed slanted rear surfaces 106a and 106b.

Since the front faring 104 blocks the rear view of a conventional center high mounted stop lamp located at a top rear portion of the passenger cabin 110, a rear face of the tonneau cover 102 is equipped with an additional center high mounted stop lamp 112 conventionally illuminated via driver brake actuation.

The tonneau cover incorporates a lock system that secures the cargo bed or pick-up box. In a locked condition, neither the tonneau cover 102 nor the tailgate 114 can be opened. To gain access, a lock cylinder 120 at the rear face of the tonneau cover is deactivated, thereby allowing the tonneau cover's rear edge to be manually lifted as it pivots about hinges along its front edge.

Figure 2:
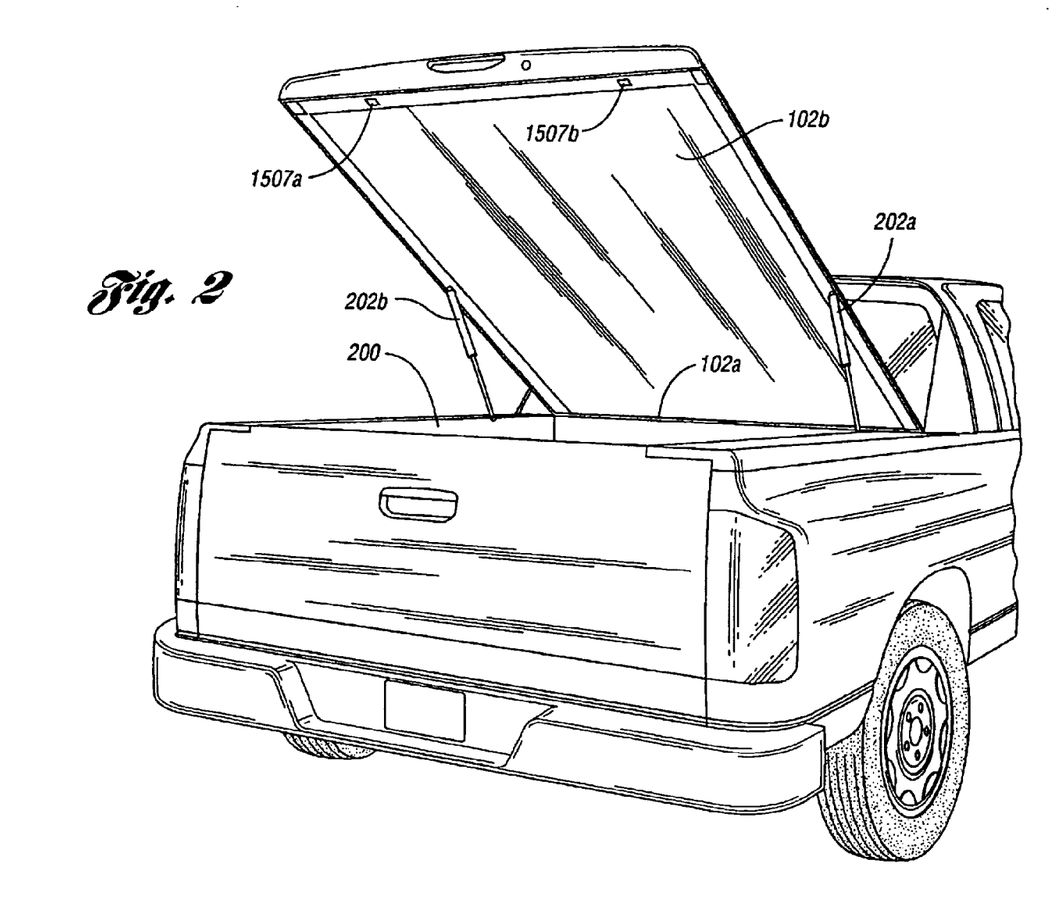
FIG. 2 is a view of the tonneau cover of FIG. 1 in a down and open position.

With reference to FIG. 2, the tonneau cover 102 is shown in a down position but pivotably opened by manually raising cover 102 about its front edge 102a to expose a downward facing undersurface of cover 102 designated 102b. At least a portion of surface 102b forms an access door to a storage compartment to be described in a later section of this description.

To assist in manually raising cover 102 about its front edge 102a, gas powered struts 202a and 202b are coupled between opposed outer side edges of cover 102 and the top panels 116a and 116b. Cargo bed 200 is thereby accessible when the tonneau cover is in this pivoted open condition.

Figure 3:
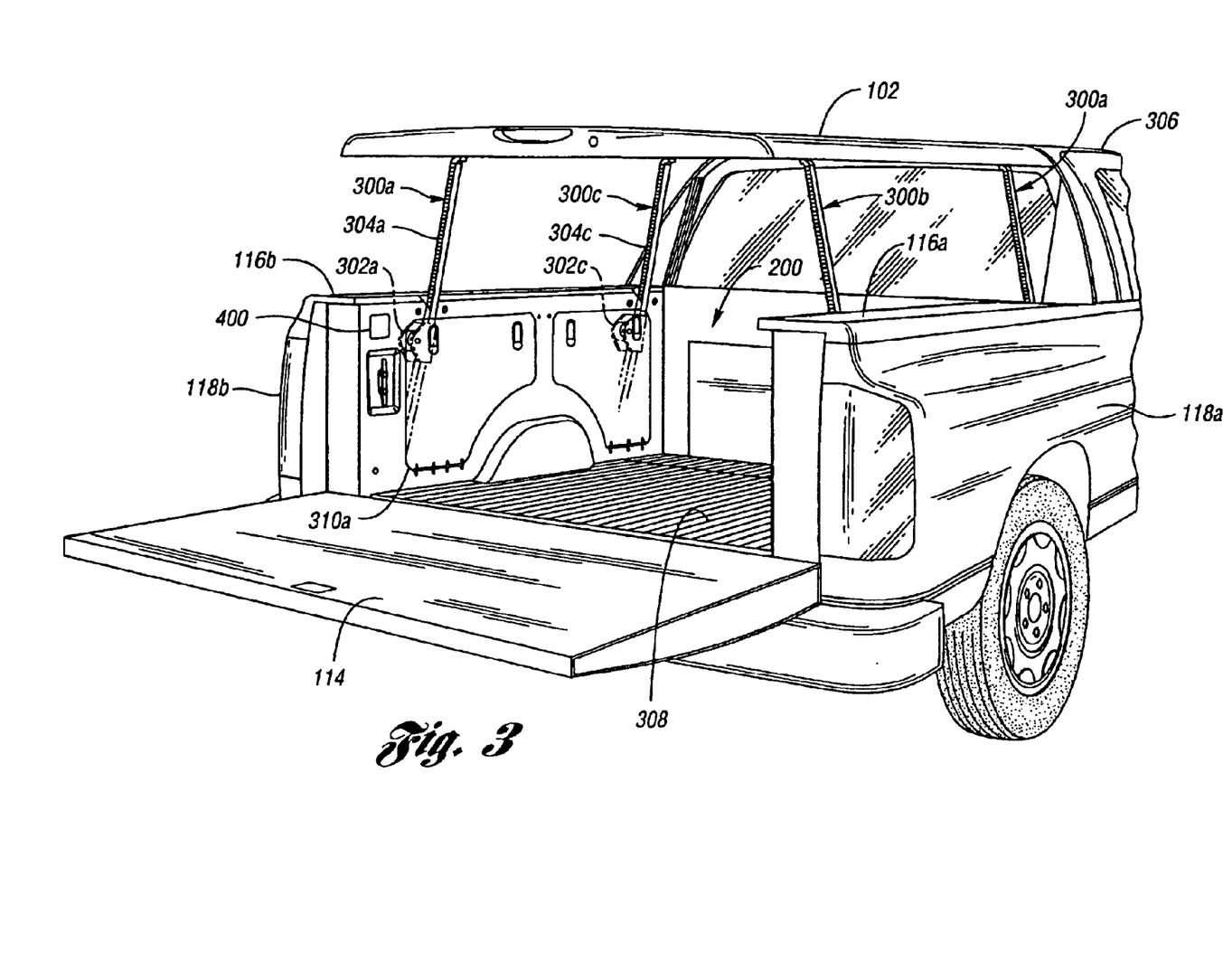
FIG. 3 is a view of the tonneau cover of FIG. 1 in an up or raised position.

With reference to FIG. 3, the tonneau cover 102 of FIG. 1 is shown in its raised condition wherein cover 102 is substantially parallel to a floor or bottom surface 308 of cargo bed 200 and substantially aligned with roof 306 of passenger cabin 110. Cover 102 reaches the position shown in FIG. 3 via operation of switches at control panel 400 which simultaneously actuate electric gear motors 302a–302d which are respectively associated with linearly extendable elements 300a–300d. Each element 300a–d has a rack 304a–d respectively associated with each linearly extending support which are engaged by associated gear motors 302a–302d housed in the side panels 118a and 118b of the vehicle.

As further seen from FIG. 3, each side panel 118a and 118b has an access door on its inner surface 310a and 310b (FIG. 6) for enabling access to the storage area in each side panel for housing rear pillar columns for the raised tonneau cover to be described in a later section.

Figure 4:
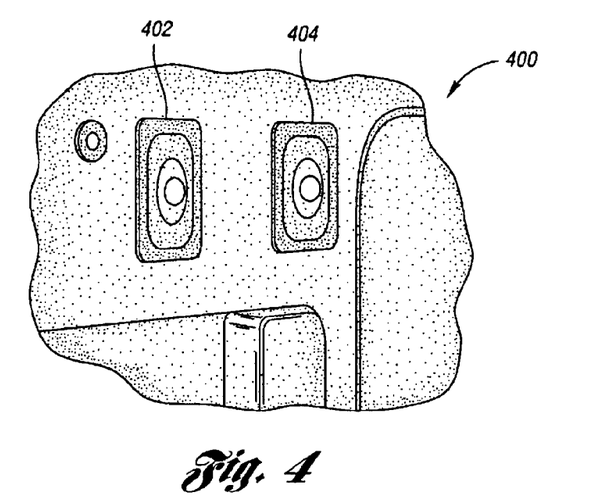
FIG. 4 is a close-up view of actuator buttons for raising and lowering the tonneau cover.

FIG. 4 shows details of control panel 400 of FIG. 3. A switch 402 is actuated to raise tonneau cover 102 as shown in FIG. 3, and switch 404 is used to lower cover 102 to the position shown in FIG. 1.

Figure 5:
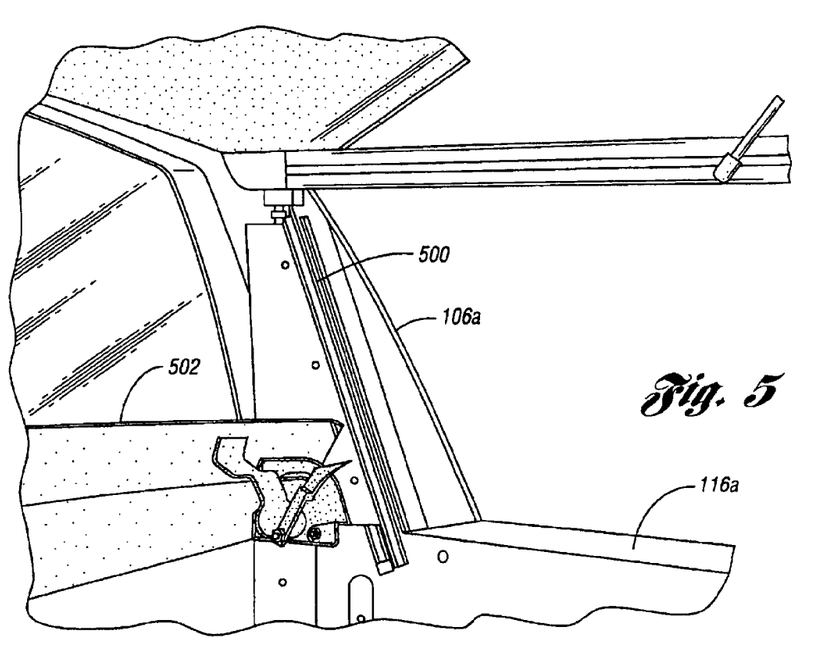
FIG. 5 is a view of one of the cover guides located on each front faring.

As tonneau cover 102 is raised or lowered by linearly extendable supports 300a–300d, its front end portions travel along a cover guide 500 formed at both sides of front faring 104, one guide shown in FIG. 5.

Figure 6:
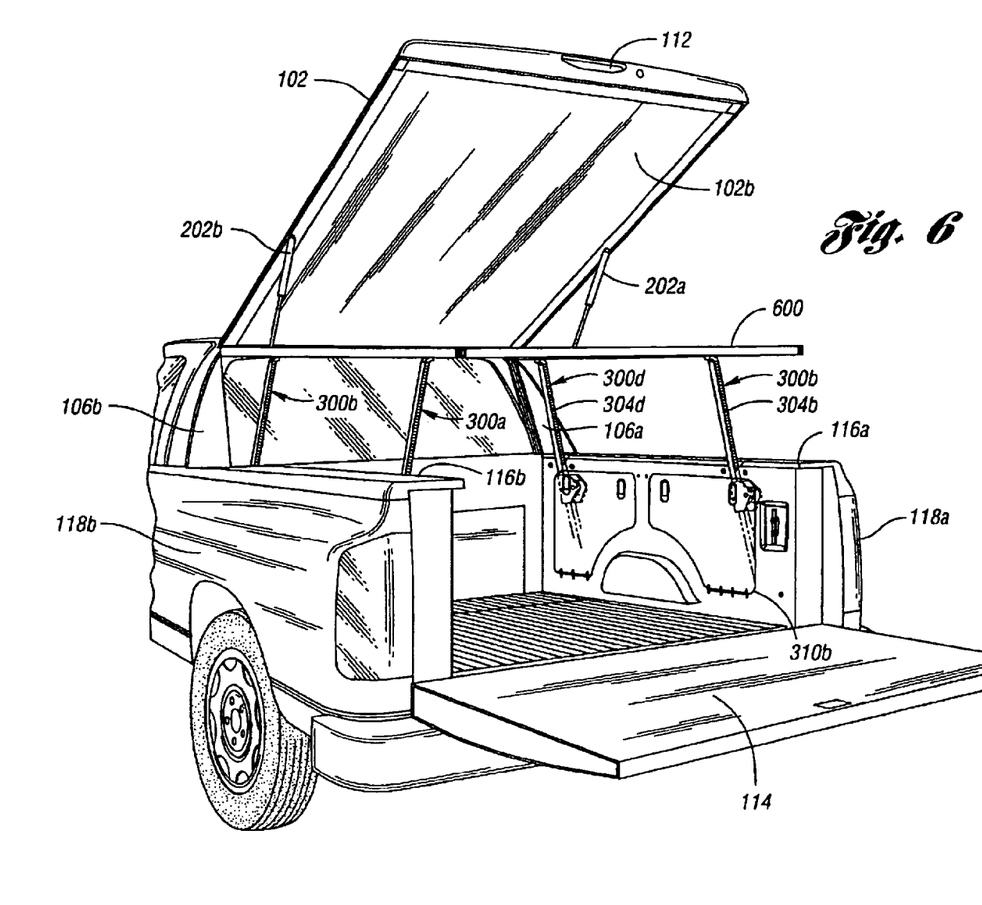
FIG. 6 is a view of the tonneau cover in an open position while also in a raised or up position.

With reference to FIG. 6, the tonneau cover 102 of FIG. 1 is shown pivoted to an open position while in a raised or up state. Also shown in FIG. 6 are the access door and phantom outline of the actuator gear motors 302B and 302d for extendable struts 300b and 300d.

Figure 7:
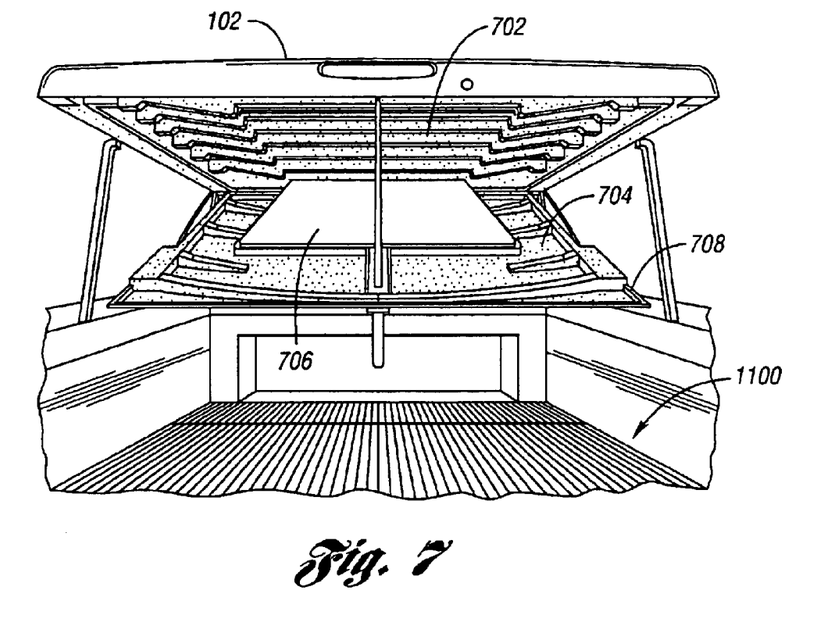
FIG. 7 is a view of an access door of the undersurface of the tonneau cover the inner support cover lowered to expose storage areas for side and rear window panels.

With reference with FIG. 7, when the under surface 102b of cover 102 is exposed, such as when tonneau cover 102 is placed in its raised position by extension struts 300, access may be had to storage areas within cover 102 for side and rear window panels to be used in the manner described below.

An outer access door 708 gains access to a side panel storage area 704, while access door 706 may additionally be swung downwardly to give access to an upper storage area 702 for containing a rear window panel unit. Hence, rear and side panels for completing a cap-like structure are housed when not in use in substantially parallel positions to the major surface of cover 102.

Figure 8:
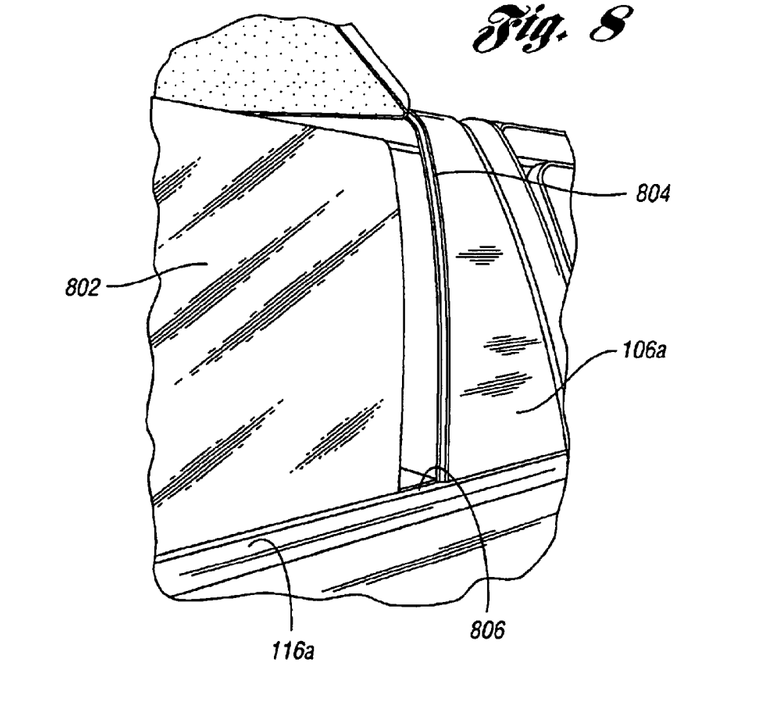
FIG. 8 is a view of one side of a side window panel partially installed and showing alignment grooves in both the faring and cargo bed side panel top plates.

As shown in FIG. 8, a partially installed side window panel 802 slides from the rear of the cargo bed towards the passenger cabin along alignment grooves 806 formed in top plates 116a, 116b and rests in alignment grooves 804 in the front faring side panels 106a and 106b.

Figure 9:
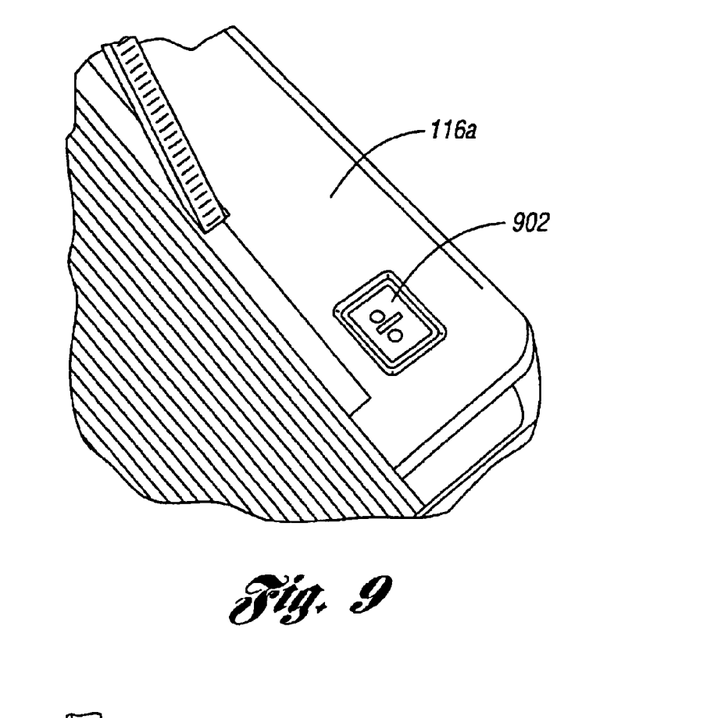
FIGS. 9 and 10 are views of a rear corner pillar locking mechanism in a lowered and raised position, respectively.
Figure 10:
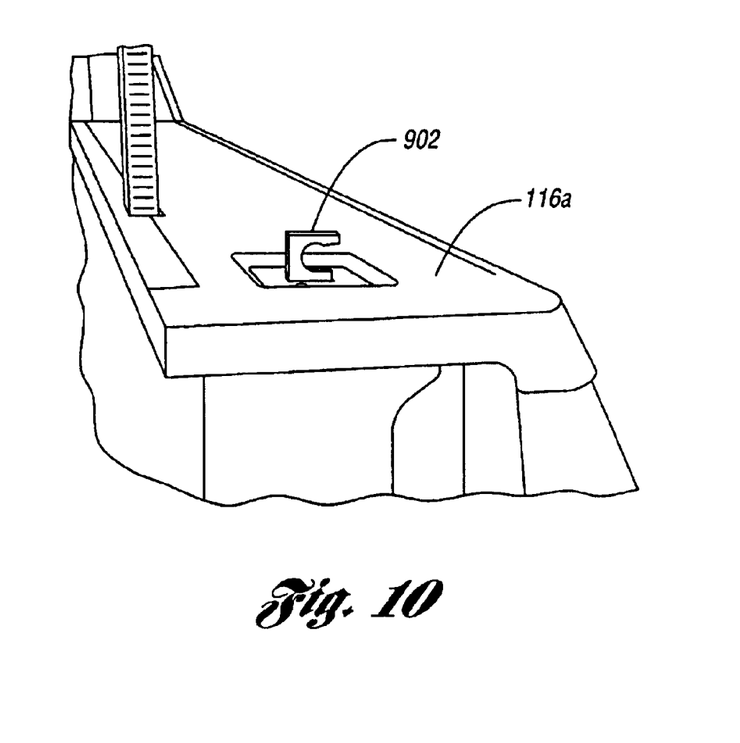
Figure 11:
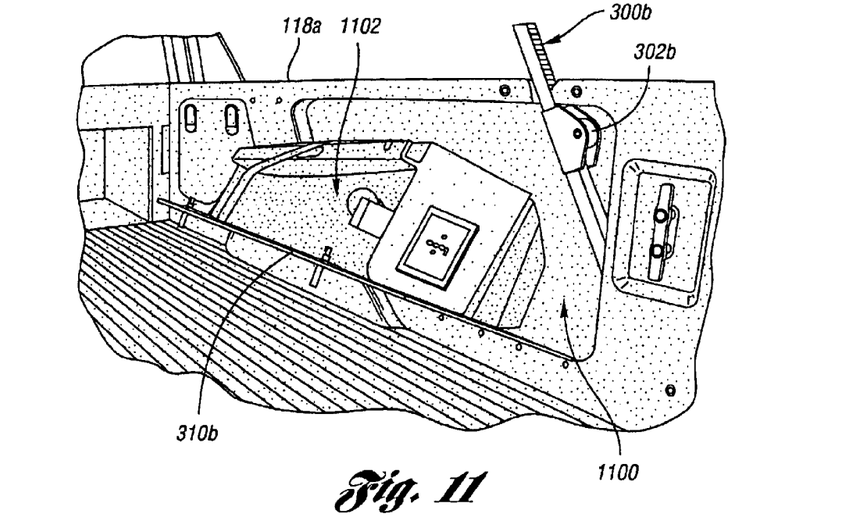
FIG. 11 is a view of an access door in a side panel of the cargo bed open and showing a rear corner pillar in a storage position.
Figure 12:
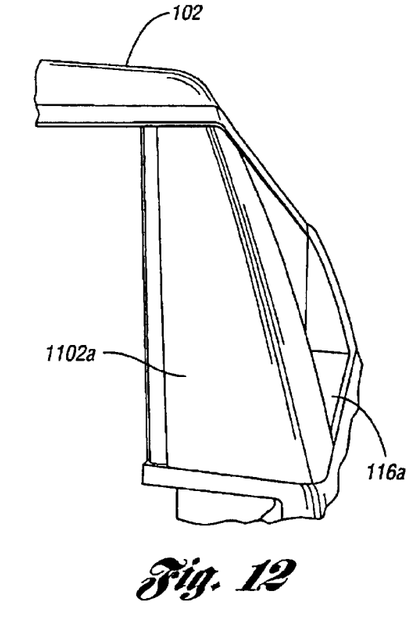
FIG. 12 is a view of a rear corner pillar attached to a side panel top plate of the vehicle.

With reference to FIGS. 9–15, first and second rear pillar units 1102a and 1102b are adapted to engage rear portions of top panels 116a and 116b and rear corners of the tonneau cover 102 when in its raised position. When not in use, pillars 1102a and 1102b are stowed in storage areas 1100 in opposed side panels 118a and 118b, respectively. FIG. 11 shows access door 310b and side panel 118a pivoted downward to expose storage area 1100 for a stored rear pillar 1102a.

Figure 13:
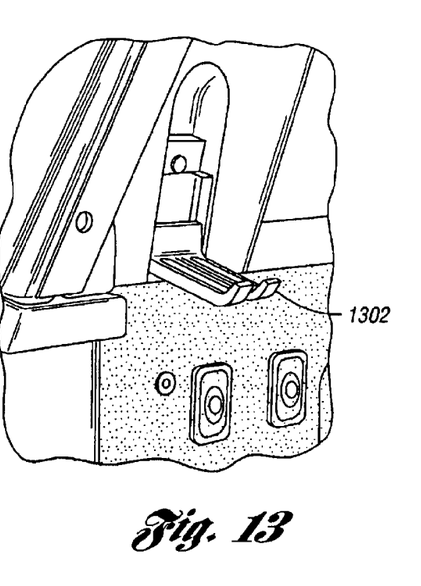
FIG. 13 is a view of a locking mechanism on a rear corner pillar that engages a side panel top plate locking mechanism.

Each rear corner pillar 1102a,b is adapted to lockingly engage its respective top panel 116a,b via a latching element 902 which may be manually pulled upwardly as shown in FIG. 10 from stored position virtually flush with the top panel 116a as shown in FIG. 9. When in the raised position of FIG. 10, latching element 902 engages a locking mechanism 1302 associated with each corner pillar. The specific locking mechanism for pillar 1102b is shown in FIG. 13. When fully assembled to the top panel, the rear pillar 1102a, for example, engages tonneau cover 102 at its rearward corner when the cover 102 is lowered down to engage pillar 1102a.

Figures 14, 15:
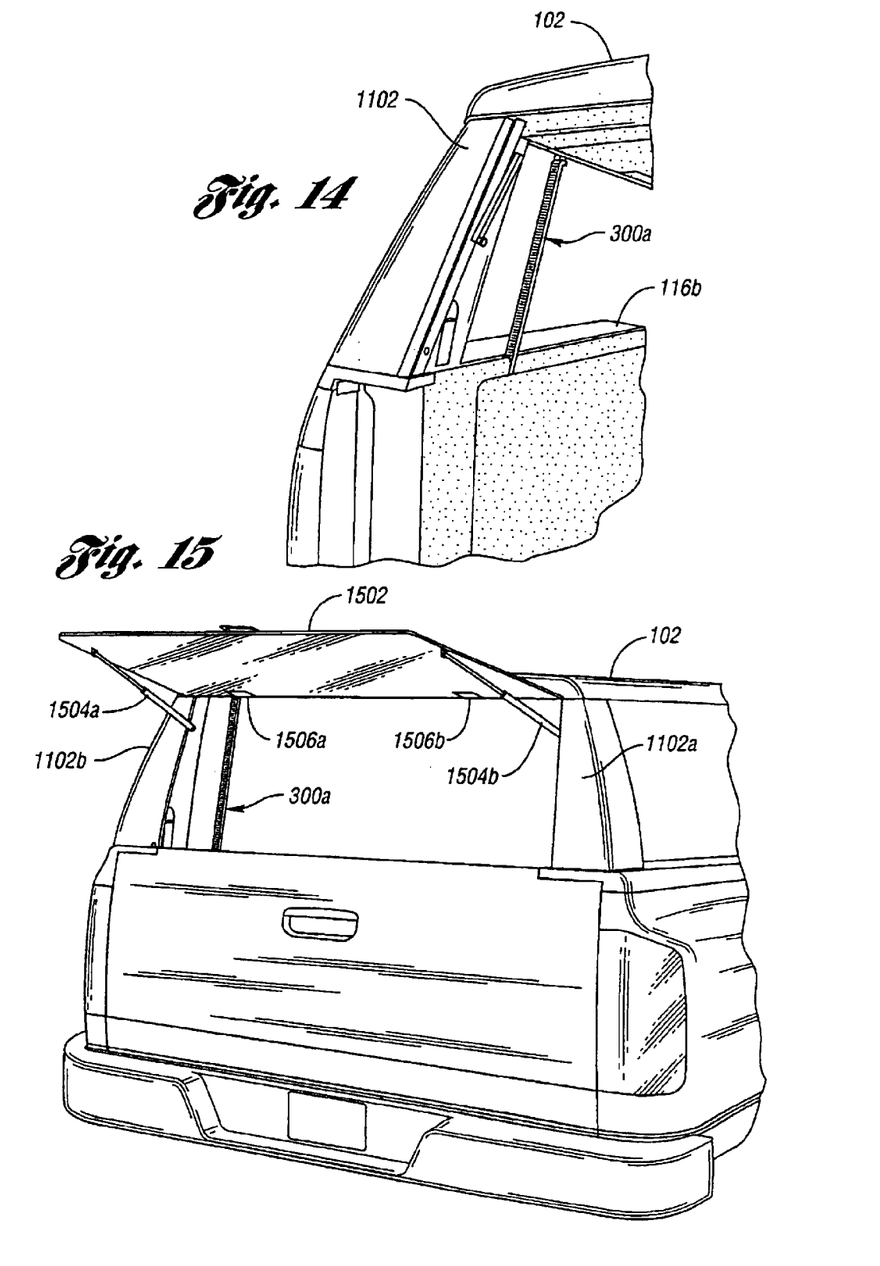
FIG. 14 is a view of the tonneau cover lowered to engage a top of a rear corner pillar.
FIG. 15 is a view of the rear window panel in an installed and open position.

Each rear pillar carries a support strut 1504 for assisting in manually raising a rear window panel 1502 (FIG. 15). As shown in FIG. 15, support struts 1504a and 1504b are respectively associated with rear pillars 1102b and 1102a. The rear window panel when taken from its storage area in cover 102 may be pivotally installed to the rear edge of the tonneau cover via quick disconnect hinge halves 1506a and 1506b, which respectively mate with hinge halves 1507a and 1507b (FIG. 2) mounted to the rear edge of tonneau cover 102, to thereby be rotatable between a closed position and an open position as shown in FIG. 15.

Figure 16:
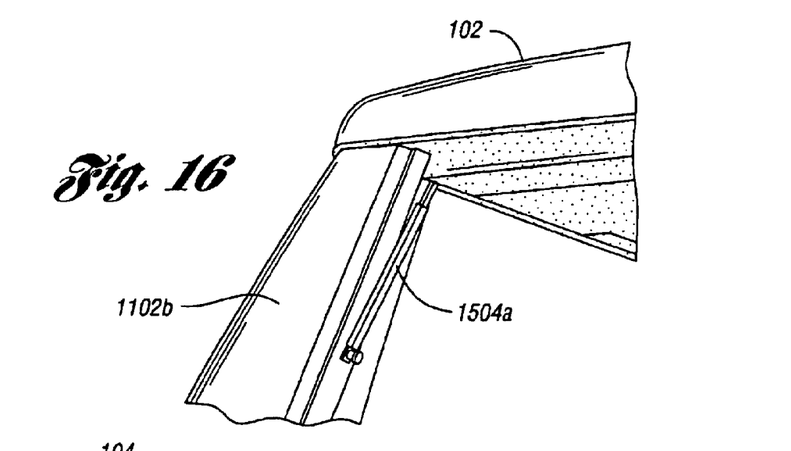
FIG. 16 is a view of a support strut for the rear window panel in a stored position on a rear corner pillar.

With reference to FIG. 16, support lift strut 1504a is shown in its non-used condition with one end thereof permanently attached to an associated rear pillar 1102b.

Figure 17:
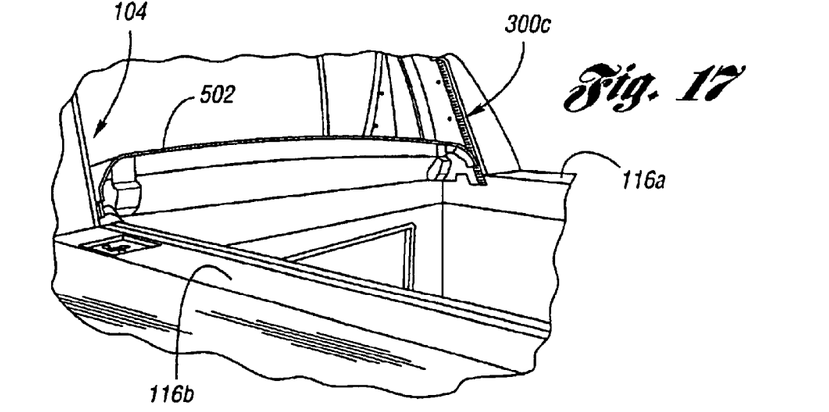
FIG. 17 is a view of a cover hingeably connected to the faring and enclosing a front edge of the tonneau cover when the tonneau cover is in its down position.

With reference to FIG. 17, cover flap 502 is hingedly connected to the faring 104 and is adapted to enclose a front edge of the tonneau cover 102 in its down and closed position as shown in FIG. 1.

Figure 18:
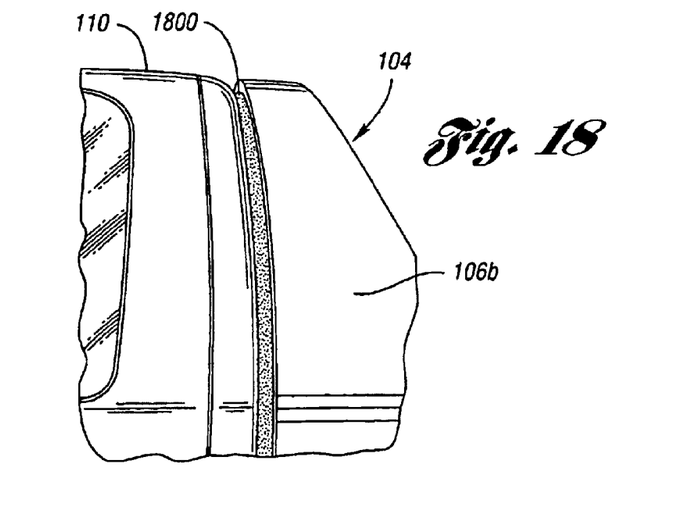
FIG. 18 is a view of a seal between the faring and the passenger cabin to prevent entry of weather elements at this joint.

FIG. 18 shows a seal 1800 placed between faring 104 and passenger cabin 110 to provide a weather-tight juncture between faring 104 and cabin 110.

With reference to all of the drawing Figures, the features of the convertible cover arrangement of the invention may be summarized, as follows.

The tonneau cover 102 extends rearwardly from a base 108 of faring 104 to a rear edge of the cargo bed or pick-up box. Cover 102 is constructed from a rigid material. The overall shape and width of tonneau cover 102 also matches the roof of the passenger cabin and faring. The overall width of tonneau cover 102 is less than a top surface width of the cargo bed or pick-up box. Hence, the side panel top plates 116a and 116b are designed to extend inboard and provide a sealing surface for tonneau cover 102.

An extension panel 502 located forward of the tonneau cover 102 and placed between bases of the faring 104 completes the pick-up box top cover. A weather seal on the front edge of the tonneau cover (not shown) prevents intrusion by the elements at this joint. The extension panel 502 is hinged along a front edge thereof and mechanically interfaces with tonneau cover 102 to open and close as tonneau cover 120 travels up and down via linearly extendable supports 300a–d.

An independent perimeter frame 600 (FIG. 6) and high pressure gas lift struts 202a and 202b are incorporated into tonneau cover 102 to assist in raising it and also in maintaining its raised position. Tonneau cover 102 may be raised high enough to provide unobstructed access to items in the cargo bed or pick-up box 200. By partially lifting a rear edge of the tonneau cover 102, access to power control switches 402, 404 for the tonneau cover, mounted inside the cargo bed or pick-up box at panel 400 just forward of the tailgate opening is obtained.

Electrically powered gear motors 302a–b and associated racks 304a–d are positioned at each corner of tonneau cover 102. When activated, motors 302*a–d* simultaneously operate to raise the tonneau cover 102 until its height is flush with a roof of the passenger cabin 110 and faring 104. In this raised position, the rear of tonneau cover 102 can also be tilted upward as shown in FIG. 6.

An inner panel 102*b* of tonneau cover 102 drops down to gain access to a storage compartment 704 for side window panels 802 an a storage compartment 702 for a rear window panel 1502. Slots in outboard/underside edges of tonneau cover 102, in outboard/top surfaces of the pick-up side panel top plates, and a rear face of the front faring provide tracks 500 which allow the side windows to slide into place from the rear of the vehicle. The rear window panel has quick disconnect hinges 1506*a,b* that attach to mating hinge halves 1507*a* and 1507*b* located on the rear/underside edge of tonneau cover 102. This allows the rear window panel to be opened upward to gain access to the cargo bed or pick-up box. Folding arms or support struts 1504*a,b* can be engaged to hold the rear window panel in a raised position. Rear window panel 1502 additionally incorporates a lock (not shown) to secure the pick-up box area when desired when the convertible cover is being used as a cap. The side and rear window panels are at least partially fashioned from window glass or other appropriate transparent material.

Rear corner pillars 1102*a,b*, which are stored inside the pick-up box side panel bins 1100 via access doors 310*a,b*, have bottom surfaces that key into mating depressions in the top rear corners of the pick-up box. Over-center latches secure them in place. Front faces of the pillars also have tracks that mate with the rear edge of the side windows. Their installation completes the pick-up box enclosure which is both lockable and weather-tight.

The invention has been disclosed with reference to a detailed description of an embodiment of the invention, which is to be taken for the sake of example only. The scope and spirit of the invention are to be determined from the appropriately interpreted claims.

What is claimed is:

1. A deployable cover for a cargo bed of a vehicle comprising:
    a movable tonneau cover having a closed position adapted to close off the cargo bed, the tonneau cover including a storage compartment; and
    a plurality of linearly extendable supports positioned with respect to the tonneau cover such that they may extend to move the tonneau cover from its closed position to an upwardly extended deployed position wherein the tonneau cover is substantially parallel to a bottom surface of the cargo bed; and
    first and second side panels and a rear panel, each carried by the storage compartment in a stowed position substantially parallel with a downward facing surface of the tonneau cover, and wherein the side and rear panels are moveable to a deployed position substantially perpendicular to the tonneau cover so as to form in conjunction with the tonneau cover when in the deployed position a box cover for the cargo bed.

2. The deployable cover of claim 1 wherein each linearly extendable support is associated with a motor, each motor being coupled to a control switch for simultaneous activation of the motors for extending the supports.

3. The deployable cover of claim 2 wherein each motor includes a drive gear and each extendable support includes a rack positioned for engagement with a respective drive gear.

4. The deployable cover of claim 1 wherein the tonneau cover is pivotably movable about at least one edge of the cover.

5. The deployable cover of claim 4 wherein the tonneau cover is pivotably movable about the at least one edge in both the closed position and the deployed position.

6. The deployable cover of claim 1 wherein at least one of the side and rear panels are at least partially fashioned from a transparent material.

* * * * *